(12) United States Patent  
Lo et al.

(10) Patent No.: US 7,241,041 B2  
(45) Date of Patent: Jul. 10, 2007

(54) BACKLIGHT MODULE

(75) Inventors: Chi-Chung Lo, Yongjing Township, Changhua County (TW); Che-Chih Chang, Toufen Town, Miaoli County (TW)

(73) Assignee: AU Optronics Corp., Hsinchu (TW)

( * ) Notice: Subject to any disclaimer, the term of this patent is extended or adjusted under 35 U.S.C. 154(b) by 64 days.

(21) Appl. No.: 10/989,092

(22) Filed: Nov. 15, 2004

(65) Prior Publication Data

US 2005/0254261 A1  Nov. 17, 2005

(30) Foreign Application Priority Data

May 12, 2004 (TW) ............................... 93113374 A

(51) Int. Cl.
*F21V 7/04* (2006.01)

(52) U.S. Cl. ............... 362/633; 362/632; 362/634; 362/628; 349/58

(58) Field of Classification Search ........... 362/618, 362/627, 628, 632, 633, 634, 561
See application file for complete search history.

(56) References Cited

U.S. PATENT DOCUMENTS

| 6,835,961 | B2 * | 12/2004 | Fukayama | 257/84 |
| 6,950,154 | B2 * | 9/2005 | Lee | 349/58 |
| 2002/0089839 | A1 * | 7/2002 | Chien et al. | 362/31 |
| 2003/0231499 | A1 | 12/2003 | Kao | 362/362 |
| 2004/0240195 | A1 * | 12/2004 | Tsai | 362/31 |

FOREIGN PATENT DOCUMENTS

JP  2003315793  6/2003
WO  WO 2004015490  2/2004

* cited by examiner

*Primary Examiner*—Renee Luebke
*Assistant Examiner*—Evan Dzierzynski
(74) *Attorney, Agent, or Firm*—Thomas, Kayden, Horstemeyer & Risley

(57) ABSTRACT

A backlight module is provided. The backlight module includes a frame, a light source and at least an optical film. The optical film has a first side with a first positioning flange and a second positioning flange, a second side with a third positioning flange and a third side with a fourth positioning flange. The edges of the first positioning flange, the second positioning flange, the third positioning flange and the fourth positioning flange abut the edges of the frame to hold the optical film in the frame.

26 Claims, 7 Drawing Sheets

US 7,241,041 B2

BACKLIGHT MODULE

This application claims the benefit of Taiwan application Serial No. 93113374, filed May 12, 2004, the subject matter of which is incorporated herein by reference.

BACKGROUND OF THE INVENTION

1. Field of the Invention

The present invention relates in general to a backlight module. More particularly, the present invention relates to a backlight module capable of holding an optical film without using any extra components and having additional aperture disposed on the optical film.

2. Description of the Related Art

Along with the rapid advance in the manufacturing technology and featured by the advantages of compactness, slimness, low power consumption and low radiation, liquid crystal display (LCD) has been widely applied in a variety of electronic devices such as personal digital assistant (PDA), notebook computer, digital camera, digital video recorder, mobile phone, computer monitor and TV monitor. Since the LCD panel used in an LCD is not a self-luminous panel, a light source provided by a backlight module is needed for an LCD panel to display.

Referring to FIG. 1A, a schematic diagram of a conventional backlight module is shown. In FIG. 1A, a backlight module 10 comprises a frame 11, a light-guide plate 12 and at least an optical film 13. The light-guide plate 12 and the optical film 13 are both fixed in the frame 11, wherein the bottom side of the optical film 13 is adhered onto the top surface of the light-guide plate 12 via a tape. One lateral side of he optical film 13 has two flanges 13a and 13b, which respectively have apertures 13c and 13d disposed thereon. The two apertures 13c and 13d are used for two bolts 15a and 15b to pass through. After the bolts 15a and 15b have respectively passed through the apertures 13c and 13d and are bolted to the frame 11, the optical film 13 will be fixed in the frame 11.

Referring to FIG. 1B, another schematic diagram of a conventional backlight module is shown. In FIG. 1B, a backlight module 20 comprises a frame 21, a light-guide plate (not shown) and at least an optical film 23, wherein the light-guide plate and the optical film 23 are both fixed in the frame 21. The frame 21 has hooks 21a and 21b, one lateral side of the optical film 23 has the flanges 23a and 23b, another lateral side of the optical film 23 has two flanges 23e and 23f, which have apertures 23c and 23d disposed thereon respectively for bolts 25a and 25b to pass through. The two flanges 23e and 23f respectively have apertures 23g and 23h for being hooked to hooks 21a and 21b. After the bolts 25a and 25b have respectively passed through the apertures 23c and 23d and are bolted to the frame 21, and after the apertures 23e and 23f have respectively been hooked to the hooks 21a and 21b, the optical film 23 will be fixed in the frame 21. For a conventional optical film to be fixed in the frame parts such as tapes, bolts or hooks are indispensable. However, extra cost and processing of parts will occur. Moreover, the conventional way of fixing the optical film cannot fix the optical film within the frame firmly, causing the optical film to be folded easily or affecting the luminance quality of a backlight module severely as shown in FIG. 1A. The conventional method is to make apertures on an optical film to form an optical film with apertures disposed thereon. However, the excavated materials, which cannot be used any more, will be wasted.

SUMMARY OF THE INVENTION

It is therefore an object of the invention to provide a backlight module whose design of using the cooperation between a frame and a light-guide plate to fix the optical film in three mutually perpendicular directions improves the reliability of fixing the optical film without using extra components such as tapes, bolts or hooks, so as to save parts costs. Besides, that the optical film slides into the frame to be fixed therein, improves the convenience of fixing the optical film and that the aperture-free design of the optical film reduces material waste.

According to the object of the present invention a backlight module comprising a frame, a light source and at least an optical film is provided. The light source is disposed within the frame. The optical film has a first side with a first positioning flange and a second positioning flange, a second side with a third positioning flange and a third side with a fourth positioning flange. The edges of the first positioning flange, the second positioning flange, the third positioning flange and the fourth positioning flange abut the edges of the frame to hold the optical film in the frame.

According to another object of the present invention, a backlight frame structure is provided. The backlight frame structure includes an accommodating area and a number of frame sides. The accommodating area is configured to receive one or more optical film having a first side with a first positioning flange and a second positioning flange, a second side with a third positioning flange and a third side with a fourth positioning flange. The frame sides abut the edges of the first positioning flange, the second positioning flange, the third positioning flange and the fourth positioning flange to hold the optical film in the frame.

Other objects, features, and advantages of the present invention will become apparent from the following detailed description of the preferred but non-limiting embodiments. The following description is made with reference to the accompanying drawings.

DETAILED DESCRIPTION OF THE INVENTION

Figure 1A:
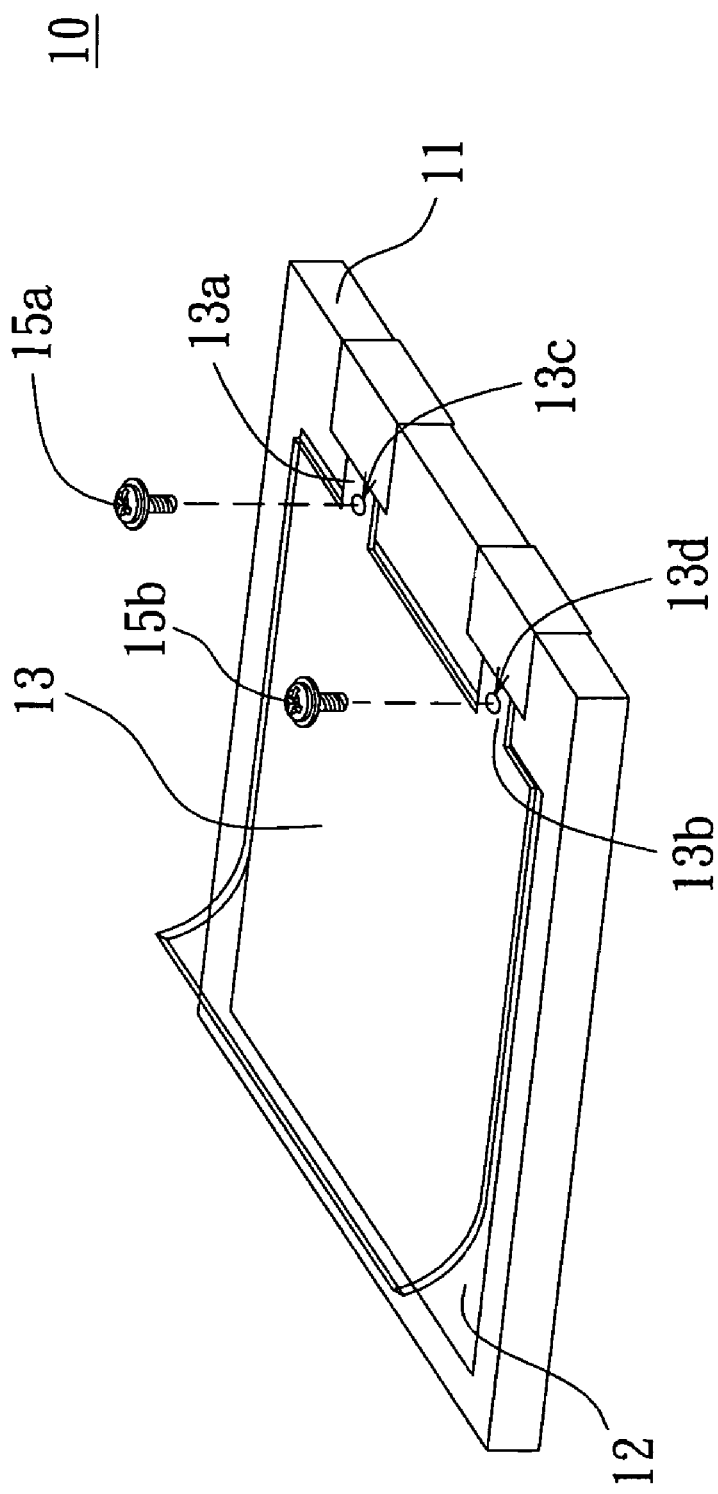
FIG. 1A is a schematic diagram of a conventional backlight module.
Figure 1B:
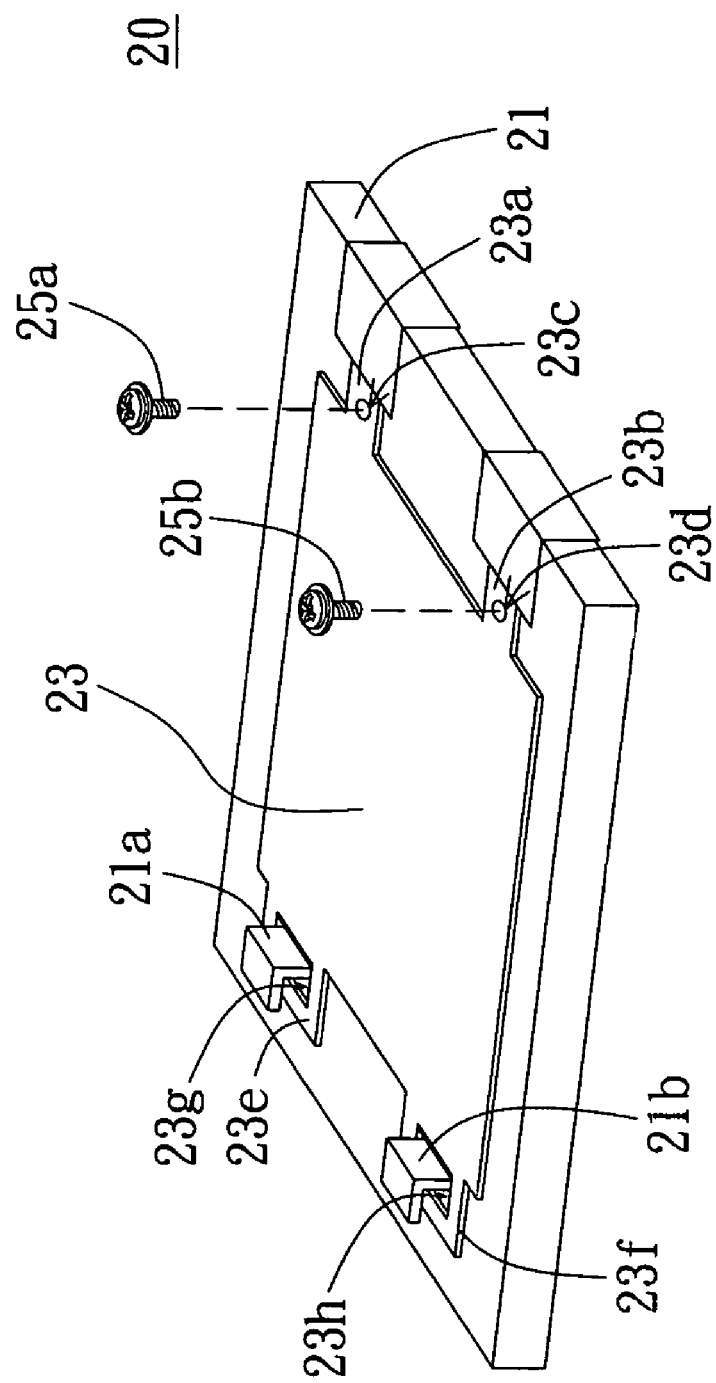
FIG. 1B is another schematic diagram of a conventional backlight module.
Figure 2:
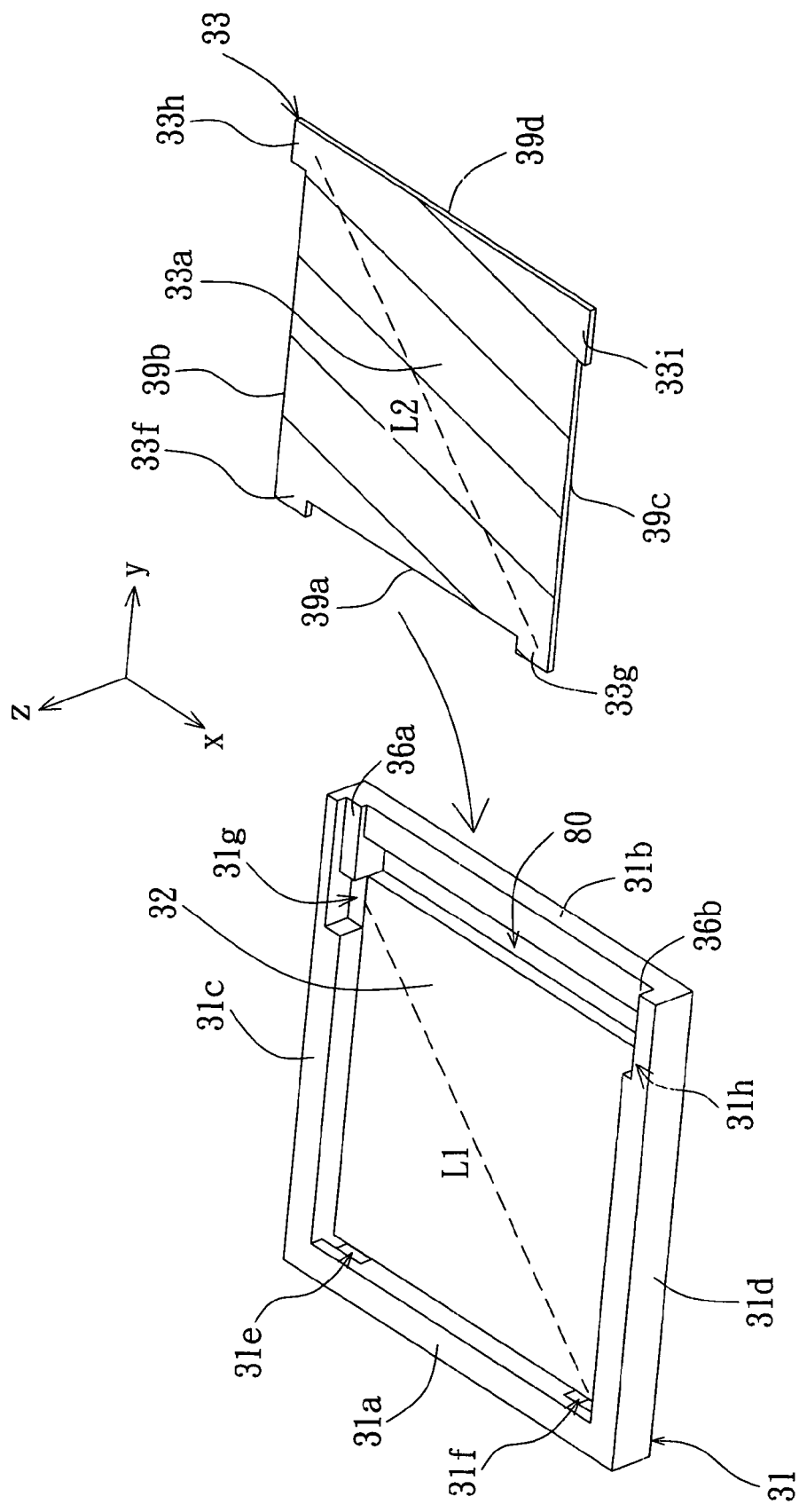
FIG. 2 and FIG. 3 are two partial explosion diagrams of the backlight module according to a preferred embodiment of the invention.
Figure 3:
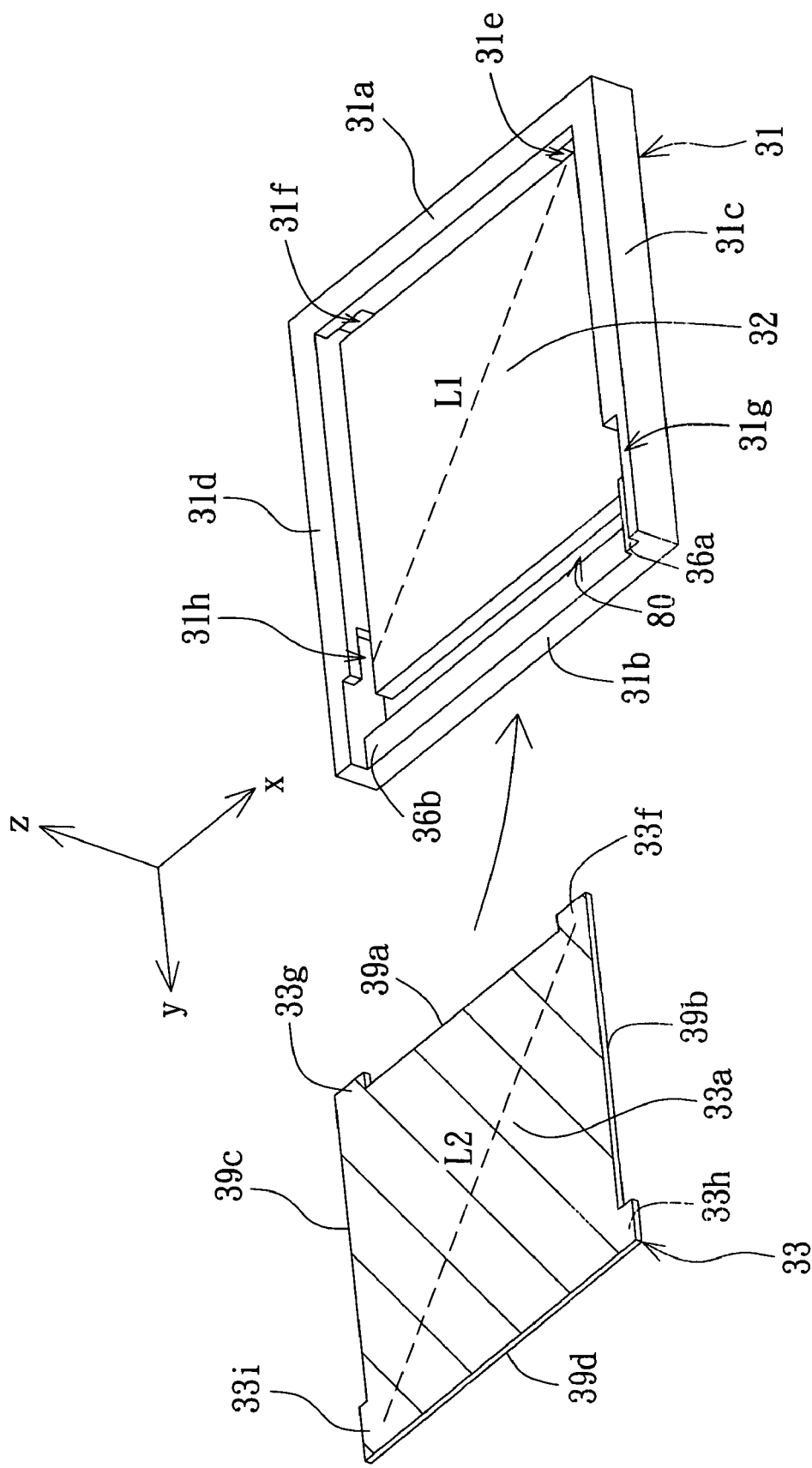

Referring to FIG. 2 and FIG. 3, two partial explosion diagrams of the backlight module according to a preferred embodiment of the invention are shown. In FIG. 2 and FIG. 3, a backlight module 30 comprises a frame 31, a light-guide plate 32 and at least an optical film 33. The frame 31 further comprises a number of frame sides, such as two opposite frame sides 31a and 31b and another two opposite frame sides 31c and 31d. The frame sides 31a and 31b are connected to the frame sides 31c and 31d. The frame sides 31a to 31d form an accommodating area 80 configured to receive the light-guide plate 32 and at least an optical film 33. The light-guide plate 32 is disposed on the accommodating area 80 of the frame 31. The luminance of the backlight module 30 comes from a light source (not shown in FIG. 2 and FIG. 3), wherein the light source, which is disposed on the frame 31, is located underneath a surface or beside a lateral side of the light-guide plate 32.

The optical film 33 comprises a light-emitting surface 33a and four positioning flanges 33f, 33g, 33h and 33i, wherein the four positioning flanges 33f to 33i are located on the peripheral of the light-emitting surface 33a. The light-emitting surface 33a has four sides 39a to 39d. The side 39a is opposite to the side 39d. The side 39b is opposite the side 39c. The sides 39a and 39d are connected to the sides 39b and 39c. The position flanges 33f and 33g are disposed on the side 39a. The position flanges 33h and 33i are disposed on the side 39b and 39c respectively. The extension direction of the positioning flange 33f is substantially the same as the extension direction of the position flange 33g. The extension direction of the positioning flange 33f is shown as y direction. The extension direction of the positioning flange 33h and the extension direction of the position flange 33i are inversed. The extension direction of the positioning flange 33h is shown as x direction and the extension direction of the position flange 33i is shown as x direction. The position flanges 33f and 33g are substantially identical the feet structure of the optical film 33, and the position flanges 33h and 33i are substantially identical the shoulder structure of the optical film 33.

The two positioning flanges 33f and 33i are located at the two sides of a line L2 formed between the two positioning flanges 33g and 33h. The four positioning flanges 33f to 33i abut the edges of the frame 31, such as the frame sides 31a, 31c and 31d, to hold the optical film 33 in the frame 31 in three mutually perpendicular directions, when the optical film 33 slides into accommodating area 80 of the frame 31 via the edges of the frame31. For example, the optical film 33 slides into accommodating area 80 of the frame 31 via the frame side 31b. Of which, one of the three mutually perpendicular directions is the normal direction of the optical film 33, z direction for instance. In this embodiment of the invention, the rectangular positioning flanges 33f, 33g, 33h and 33i are exemplified for illustrating the optical film 33 mounted to the frame 31. Moreover, the shape of the optical film 33 approximates a reconcile or a polygon in practical applications, and is exemplified by the rectangular. In other embodiment, one side with two positioning flanges is adjacent another two opposite sides when the optical film has a number of sides. Each of the two opposite sides has a positioning flange.

To have the optical film 33 firmly disposed in the frame 31, the frame 31 further comprises two positioning recesses 31e and 31f and two indentations 31g and 31h, wherein the two positioning recesses 31e and 31f and the two indentations 31g and 31h correspond to the positioning flanges 33f to 33i. The two positioning recesses 31e and 31f are disposed at the two sides on the inner wall of the frame sides 31a. As shown in FIG. 2, the recesses (i.e. 31e) project into the frame and face to the accommodating area of the frame (the inner sides of the frame member). One inner wall of the positioning recess 31e is connected to the inner wall of the frame side 31c, while one inner wall of the positioning recess 31f is connected to the inner wall of the frame side 31d. The inner wall of the frame sides 31c and that of the frame side 31d have the indentations 31g and 31h disposed respectively, wherein the indentations 31g and 31h are adjacent to the frame sides 31b. Of which, the positioning recess 31e and the indentation 31h are located at the two sides of the line L1 formed between the positioning recess 31f and the indentation 31g. Furthermore, the optical film 33 can slide into or from the frame 31 via the frame edges side 31b.

Figure 4:
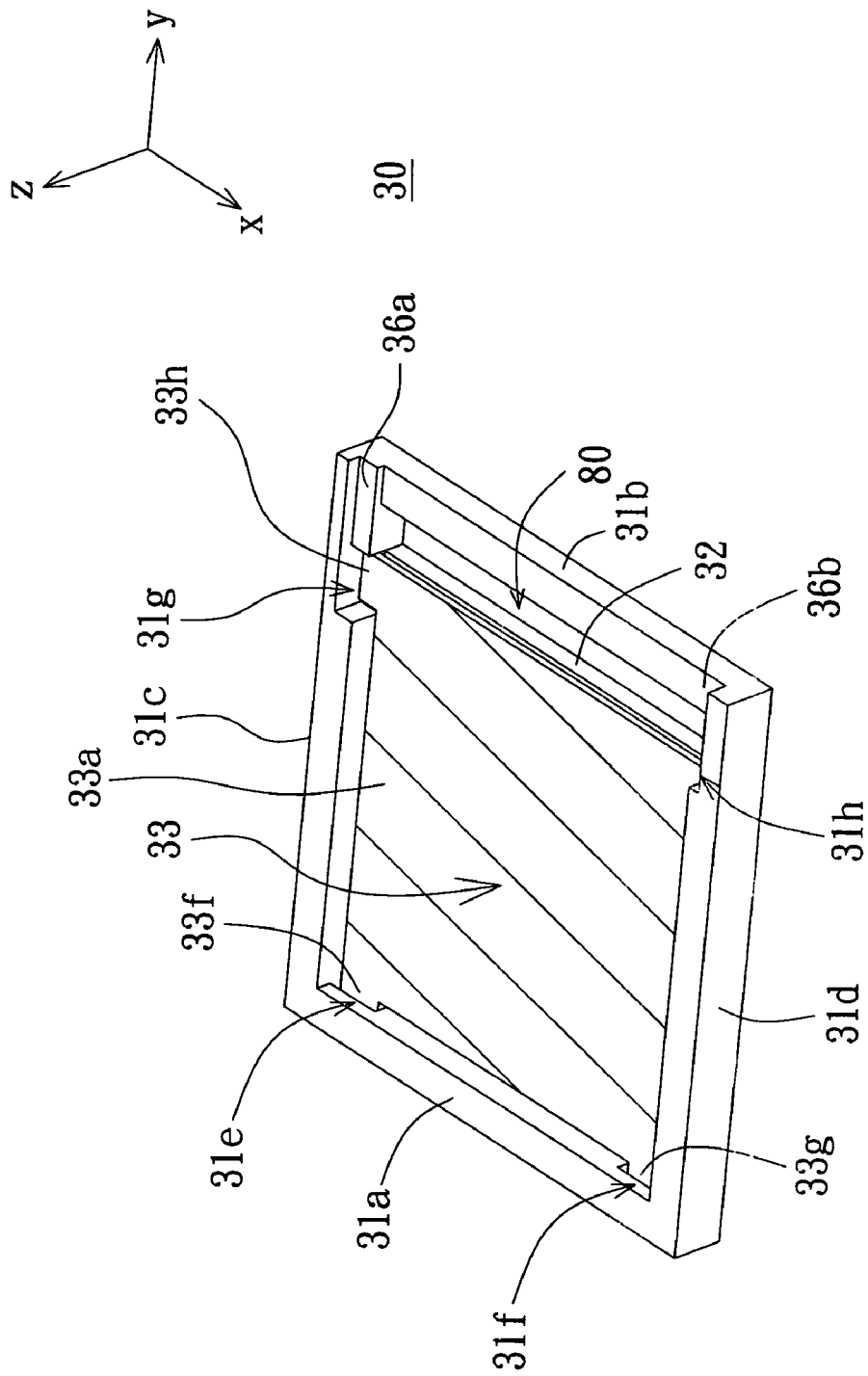
FIG. 4 is an assembly diagram of the backlight module illustrated in FIG. 2.
Figure 5:
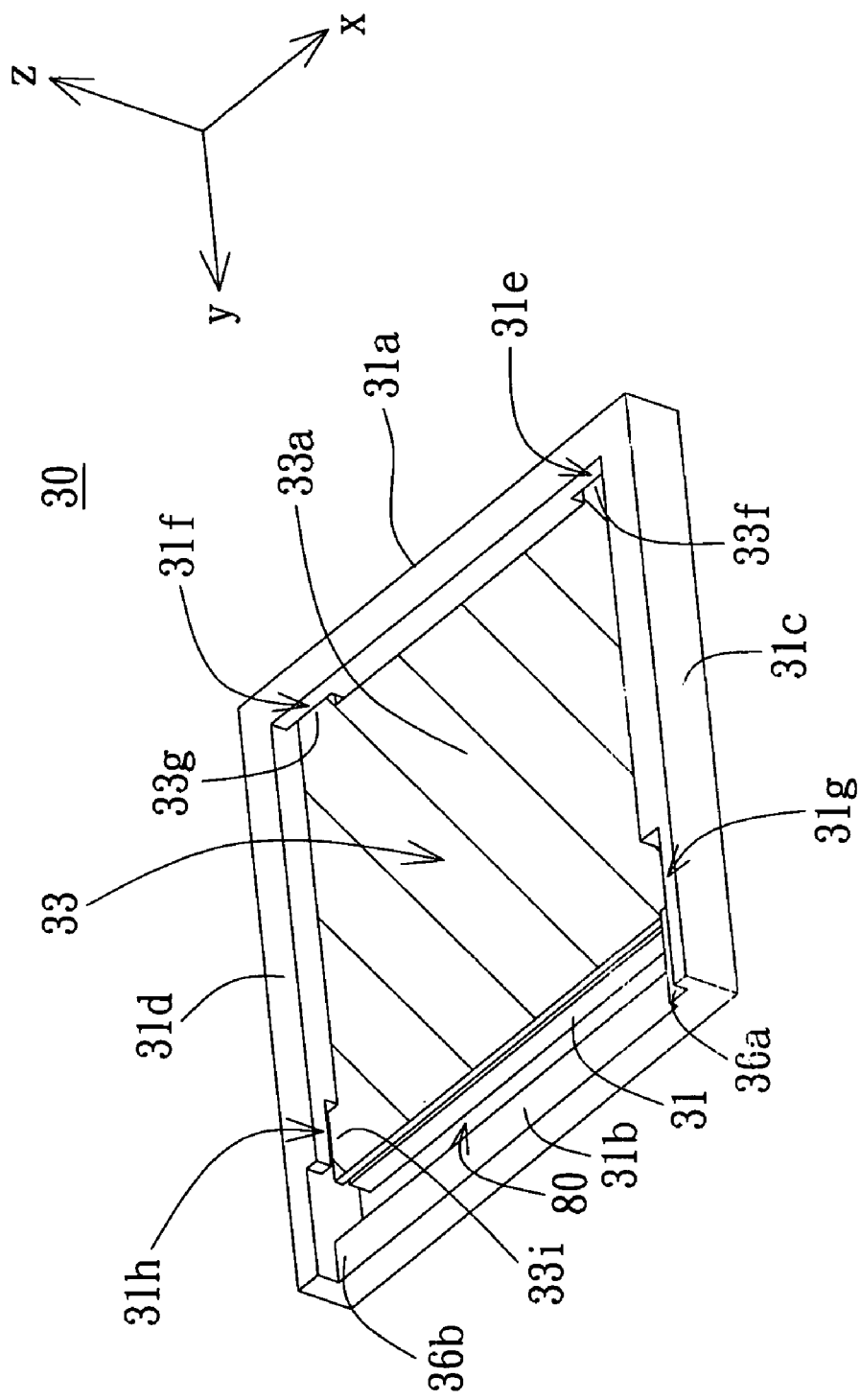
FIG. 5 is an assembly diagram of the backlight module illustrated in FIG. 3.

Referring to FIG.3, the frame member 31d includes an indentation having two portions connected to each other, one portion of the indentation is formed in part of the upper side of the frame member 31d and in part of the inner side of the frame member 31d, and the other portion 31h of the indentation formed in the inner side of the member 31d and projecting therein so as to receive one of the positioning flanges 33i and 33h. When the optical film 33 in FIG. 2 and FIG. 3 slide into the frame 31 via the frame sides 31b along the y direction, the positioning flanges 33f and 33g are inserted to the positioning recesses 31e and 31f respectively, and the positioning flanges 33h and 33i respectively slide into the frame 31 along the tracks 36a and 36b in the frame 31 to be embedded into the indentation 31g and 31h respectively as shown in FIG. 4 and FIG. 5. The optical film 33 abut against the contact edges of the frame members configuring the recess 31e and 31f at the frame member 31a, and against inner sides of the indentations 31g and 31h, so as to hold the optical film 33 in the frame 31 in x and y direction. In addition, it is noted that at least part of inner wall of recess covers at least part of the positioning flange so as to hold the optical film in the frame. For example, the inner wall of recesses 31e and 31f cover the positioning flanges 33f and 33g. It allows the optical film 33 to be hold in the frame 31 in z direction. By doing so, the optical film 33 be firmly fixed in the frame 31 in x, y, and z directions, preventing the optical film 33 from being folded and peeled off so as to maintain the luminance quality of the backlight module 30. The optical film 33 can be removed from the accommodating 80 of the frame 31 via the frame side 31b.

Figure 7:
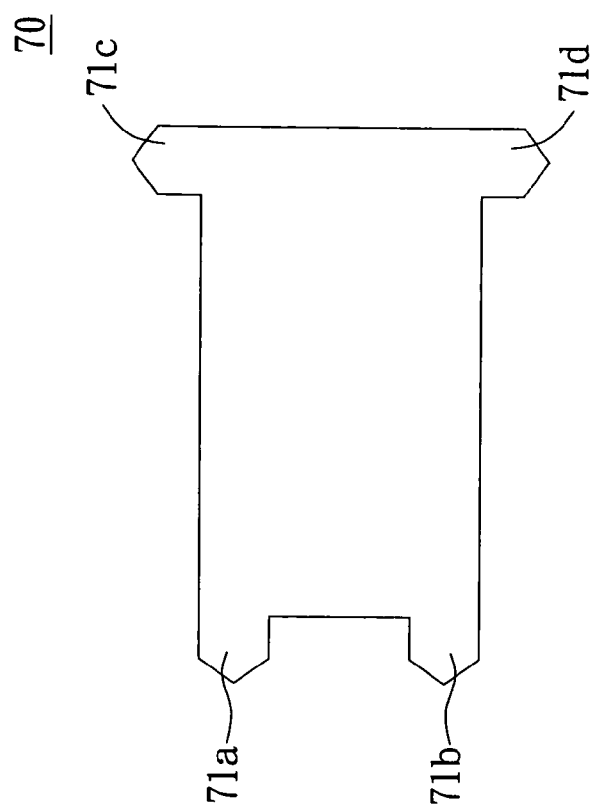
FIG. 7 is a schematic diagram of an optical film with two pentagonal positioning flanges.
Figure 6:
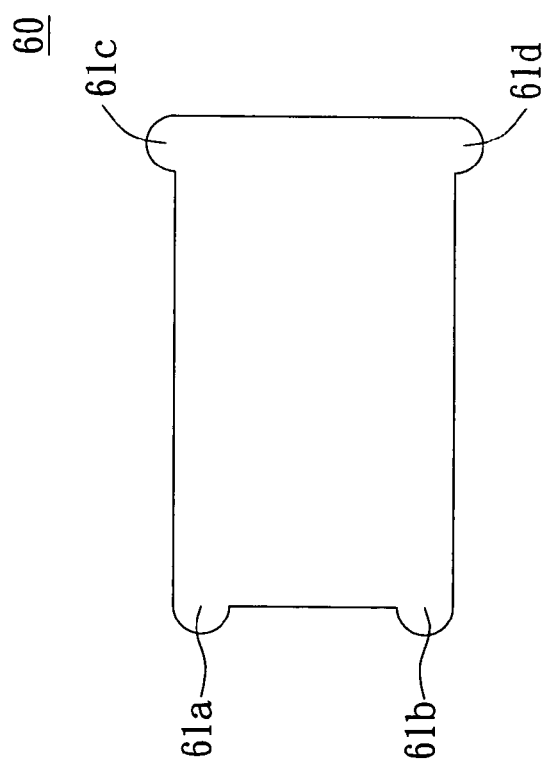
FIG. 6 is a schematic diagram of an optical film with two semi-circular positioning flanges.

Anyone who understands the technology of the invention will realize that the technology is not limited to the preferred embodiment. For example, the structure of the frame sides 31a to 31d can be formed in one block. Under the premise that the edges of the positioning flanges abut the edges of the frame, the positioning flanges can be of a variety of shapes. As illustrated in FIG. 6, the optical film 60 has four semi-circular positioning flanges 61a to 61d whose edges abut the edges of the frame, so as to hold the optical film 60 in the frame firmly in three mutually perpendicular directions. As illustrated in FIG. 7, the optical film 70 has four pentagonal positioning flanges 71a to 71d whose edges abut the edges of the frame so as to hold the optical film 70 in the frame firmly in three mutually perpendicular directions.

Moreover, when a plurality of the optical films are to be disposed on the frame, the invention can disposed four positioning flanges on the periphery of the topmost optical film only instead of disposing four positioning flanges on the periphery of each optical film. Such practice also fixes the optical films in the frame firmly. Besides, if the optical films are used to be disposed within the frame in order to fix the optical films within the frame, instead of forming the four positioning flanges at a lateral side of each of the optical films, the invention only need to form four positioning flanges at a lateral side of the topmost optical film.

The backlight module disclosed in the above embodiment of the present invention uses the cooperation between the frame and the light-guide plate to fix the optical film in x, y and z directions so as to improve the reliability of fixing the optical film without using extra components such as tapes, bolts or hooks, so as to save parts costs. Besides, that the optical film slides into the frame to be fixed therein, improves the convenience of fixing the optical film and that the aperture-free design of the optical film reduces material waste.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A backlight module, comprising:
   a frame, comprising:
   first, second, and third frame members forming a polygonal accommodating area, wherein the inner side of the first frame member has at least two recesses projecting therein and facing the polygonal accommodating area, and the second and third members have at least two indentations, respectively, at least part of the at least two indentations having two portions connected to each other, one portion of at least part of the at least two indentations formed in part of the upper side of the third frame member and in part of the inner side of the third frame member, the other portion of at least part of the at least two indentations formed in the inner side of the third member and projecting therein; and
   an optical film, having a first side with a first positioning flange and a second positioning flange, a second side with a third positioning flange, and a third side with a fourth positioning flange, edges of the frame members configuring the at least two recesses and indentations, oriented to oppositely abut against the contact edges of the flanges of the optical film to hold the optical film in the frame.

2. The backlight module according to claim 1, wherein the shape of one of the first positioning flange, the second positioning flange, the third positioning flange and the fourth positioning flange are a polygon.

3. The backlight module according to claim 1, wherein the shape of the optical film is substantially a quadrilateral.

4. The backlight module according to claim 3, wherein the first positioning flange, the second positioning flange, the third positioning flange and the fourth positioning flange are located at the four corners of the optical film.

5. The backlight module according to claim 1, wherein the first positioning flange and the second positioning flange are inserted into the at least two recesses correspondingly.

6. The backlight module according to claim 1, wherein the third positioning flange and the fourth positioning flange are embedded into the at least two indentations correspondingly.

7. The backlight module according to claim 1, wherein the extension direction of the first positioning flange is substantially the same as the extension direction of the second position flange.

8. The backlight module according to claim 1, wherein the extension direction of the third positioning flange and the extension direction of the fourth position flange are inversed.

9. The backlight module according to claim 1, wherein the optical film abuts against the contact edges of the frame members configuring the first and second recesses at the first frame member, and against inner side of the at least two indentations so as to hold the optical film in the frame in three perpendicular directions.

10. The backlight module according to claim 1, wherein the positioning flange is located at a corner of the optical film, and the contact edges of the positioning flange form a polygonally shaped shoulder of the optical film in order to fit into a similarly shaped recess in an interior corner of the frame and abut respective edges of the frame in the recess to hold the optical film in the frame.

11. A backlight frame structure, comprising:
    first, second members forming an accommodating area configured to receive at least one optical film having a first side with a first positioning flange and a second positioning flange, and a second side with a third positioning flange, wherein the inner side of the first frame member has at least two recesses projecting therein and facing the accommodating area, and the second frame member has at least one indentation, edges of the frame members configuring the at least two recesses and the at least one indentation, oriented to oppositely abut against the contact edges of flange of the optical film to hold the optical film in the frame;
    wherein the at least one indentation of the second frame member has at least two portions connected to each other, one portion of the at least one indentation formed in part of the upper side of the second frame member and in part of the inner side of the second frame member, and the other portion of the at least one indentation formed in the inner side of the second frame member and projecting therein so as to receive the third positioning flange.

12. The backlight frame structure according to claim 11, the first positioning flange and the second positioning flange are inserted into the at least two recesses correspondingly.

13. The backlight frame structure according to claim 11, wherein the third positioning flange is embedded into the at least one.

14. The backlight frame structure according to claim 11, wherein the extension direction of the first positioning flange is substantially the same as the extension direction of the second position flange.

15. The backlight frame structure according to claim 11, wherein the optical film further having a third side with a fourth positioning flange, and the extension direction of the third positioning flange and the extension direction of the fourth position flange are inversed.

16. A backlight frame structure, comprising:
    first, second, third members forming an accommodating area configured to receive at least one optical film having a first side with a first positioning flange and a second positioning flange, a second side with a third positioning flange, and a third side with a fourth positioning flange, wherein the inner side of the first frame member has at least two recesses projecting therein and facing the accommodating area, and the second frame member has at least one indentation, edges of the frame members configuring the at least two recesses and the at least one indentation, oriented to oppositely abut against the contact edges of flange of the optical film to hold the optical film in the frame:
    wherein the third frame member, adjacent to the first frame member, has at least one another indentation formed therein, the another indentation having at least two portions connected to each other, one portion of the another indentation formed in part of the upper side of the third frame member and in part of the inner side of the third frame, and the other portion of the another indentation formed in the inner side of the third frame member and projecting therein so as to receive the fourth positioning flange of the optical film.

17. The backlight frame structure according to claim 16, wherein the optical film abuts against the contact edges of the frame members configuring the first and second recess at the first frame member, and against sidewall of the two indentations so as to hold the optical film in the frame in three perpendicular directions.

18. The backlight frame structure according to claim 16, wherein the shape of one of the first positioning flange, the second positioning flange, the third positioning flange and the fourth positioning flange are a polygon.

19. The backlight frame structure according to claim 16, wherein the shape of the optical film is substantially a quadrilateral.

20. The backlight frame structure according to claim 19, wherein the first positioning flange, the second positioning flange, the third positioning flange and the fourth positioning flange are located at the four corners of the optical film.

21. The backlight frame structure according to claim 16, wherein the first positioning flange and the second positioning flange are inserted into the at least two recesses correspondingly.

22. The backlight frame structure according to claim 16, wherein the third positioning flange and the fourth positioning flange are embedded into the at least two indentations correspondingly.

23. The backlight frame structure according to claim 16, wherein the extension direction of the first positioning flange is substantially the same as the extension direction of the second position flange.

24. The backlight frame structure according to claim 16, wherein the extension direction of the third positioning flange and the extension direction of the fourth position flange are inversed.

25. The backlight frame structure according to claim 16, wherein the optical film abuts against the contact edges of the frame members configuring the first and second recesses at the first frame member, and against inner side of the indentations so as to hold the optical film in the frame in three perpendicular directions.

26. The backlight frame structure according to claim 16, wherein the positioning flange is located at a corner of the optical film, and the contact edges of the positioning flange form a polygonally shaped shoulder of the optical film in order to fit into a similarly shaped recess in an interior corner of the frame and abut respective edges of the frame in the recess to hold the optical film in the frame.

* * * * *